No. 12,459.

REISSUED FEB. 27, 1906.

W. C. ANDERSON.

FRUIT GRADER.

APPLICATION FILED JUNE 16, 1904.

2 SHEETS—SHEET 1.

Witnesses:
J. Riemann
P. J. Blakeslee

Inventor:
William C. Anderson
By Miller, Starr & Cruse
Attorneys

No. 12,459. REISSUED FEB. 27, 1906.

W. C. ANDERSON.

FRUIT GRADER.

APPLICATION FILED JUNE 16, 1904.

2 SHEETS—SHEET 2.

Witnesses:
J. Riemann.
P. Kindelee.

Inventor:
William C. Anderson.
By Miller Starr & Cruse
Attorneys.

UNITED STATES PATENT OFFICE.

WILLIAM C. ANDERSON, OF SAN JOSE, CALIFORNIA, ASSIGNOR, BY MESNE ASSIGNMENTS, TO ANDERSON-BARNGROVER MFG. CO., OF SAN JOSE, CALIFORNIA, A CORPORATION OF CALIFORNIA.

FRUIT-GRADER.

No. 12,459. Specification of Reissued Letters Patent. Reissued Feb. 27, 1906.

Original No. 703,837, dated July 1, 1902. Application for reissue filed June 16, 1904. Serial No. 212,902.

*To all whom it may concern:*

Be it known that I, WILLIAM C. ANDERSON, a citizen of the United States, residing at San Jose, county of Santa Clara, State of California, have invented an Improvement in Fruit-Graders; and I hereby declare the following to be a full, clear, and exact description of the same.

My invention relates to an apparatus for the grading of fruit, and is particularly designed for the separation of prunes into the various grades which are recognized as standard upon the market. Its object is to provide a machine of the greatest possible capacity and efficiency.

The invention consists of the parts and the constructions and combinations of parts hereinafter described and claimed.

Figure 1:
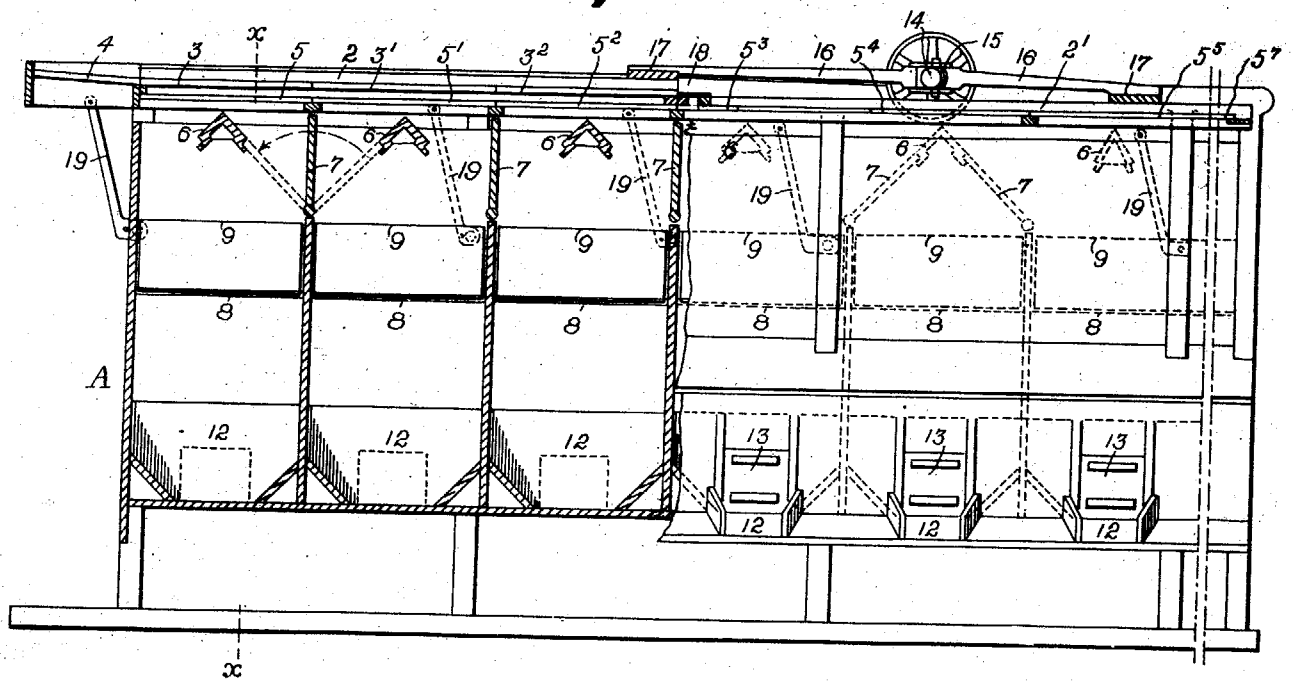
Figure 2:
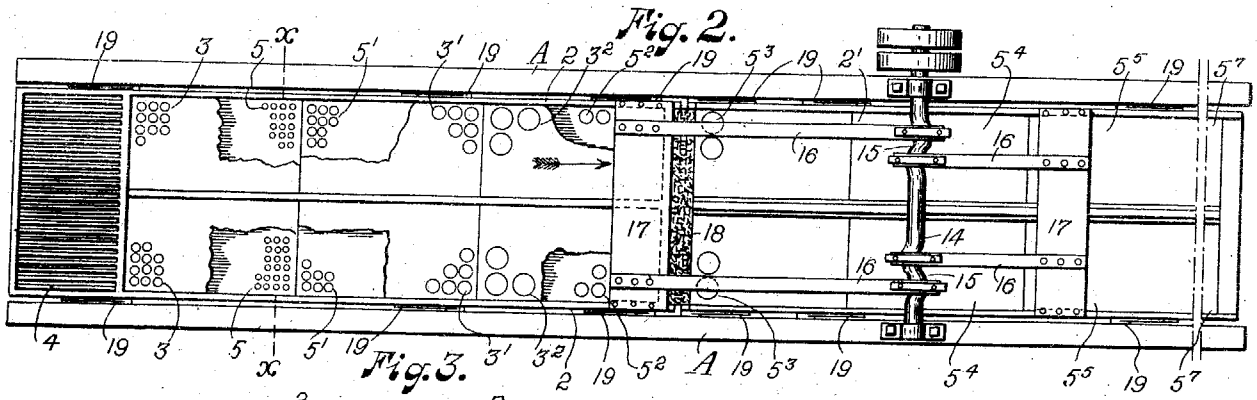
Figure 4:
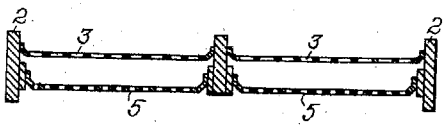
Figure 3:
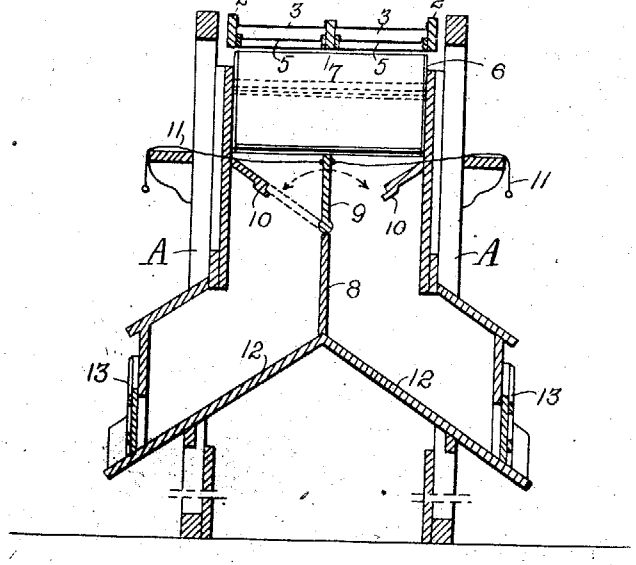

Figure 1 is a part-longitudinal section and part-longitudinal elevation of my apparatus. Fig. 2 is a plan of the upper part, certain portions being omitted and cut away. Fig. 3 is a transverse section on the line *x x*, Figs. 1 and 2. Fig. 4 is an enlarged transverse section through the first series of screens.

In preparing prunes for the market it is customary to separate them into grades according to the number per pound. Thus the smaller grades may be one hundred or more to the pound, and the intermediate grades run down to thirty or less per pound. They are universally designated as "30–40's," "40–50's," "50–60's," &c.—*i. e.*, a difference of ten forming one unit of variation.

That they may be made marketable boxes must contain prunes of approximately the same size.

The mere action of "screening" alone has not been found sufficient to effect perfect grading, and "blending" in one manner or another is always necessary.

When it comes to grading on a large scale, the difficulty increases.

One may perhaps better conceive the purpose of a machine as herein described when it is understood that a single one of these machines is capable of handling as much as one hundred and twenty-five tons of fruit in a single day.

I now proceed to describe what I consider the best mode of carrying out my invention.

Having reference to the drawings, A represents a suitable framework or structure in which the screens and bins are located. Within this structure are mounted the supports or frames 2 and 2′, as upon elastic arms 19. These frames are suitably adapted to carry the grading-screens, whereby all the screens are given a shaking, but not the same movement, as will be explained later. These grading-screens are arranged in two series one above the other. In the upper series are a limited number of screens, generally two or three, as 3 3′ 3², all in the same plane.

The fruit is primarily received into the machine upon the dirt-screener 4, consisting of longitudinally-disposed bars, whose interstices allow only leaves, dirt, &c., to drop through. The fruit is delivered upon this screener by any suitable means. In these large machines an endless traveling inclined elevator is employed. Beneath, parallel with, and extending beyond the first series of screens 3 3′, &c., is disposed a second series of screens 5 5′ 5², &c. In this series there are as many screens as there are grades of fruit to be determined, generally eight or nine. The actual grading is done by this series, for the first set only breaks up the mass of fruit and tends to distribute it gradually over the lower screens. This is effected by reason of the construction of the screens. Presuppose the fruit to run from twenty to one hundred. That would mean that there are eight units of variance or eight grades into which the fruit is to be divided. The fruit is received in a heterogeneous mass upon screen 3. The perforations in this screen allow the two smallest sizes—*i. e.*, "90–100's" and "80–90's"—readily to pass through. Consequently screen 5 beneath receives only these two sizes; but its perforations permit only the smaller of these to drop through into the bins. The remainder of the fruit from the upper screen 3 passes to the next in line. (Designated as 3′.) Through this the two next succeeding smallest sizes are passed—*i. e.*, the "70–80's" and "60–70's"—and fall upon the corresponding lower screen 5′, which is an extension of or in line with screen 5. From this latter screen there is also received the "80–90's," so screen 5′ has three grades now to handle. Its mesh is such that only the "80–90's" are passed through into the bins, and so from this screen there is passed to its successor 5² still two grades of fruit. Upon screen $5^2$ is also received two grades—*i. e.*, the "50–60's" and "40–50's"—from its upper screen $3^2$. The screen $5^2$ drops the "70–80's" and delivers three grades to its successor $5^3$, which latter receives the residue of "20–40's" from screen $3^2$. Thus the most that any one of the series has to handle at any one time are five grades. The result is that more perfect grading is possible by this means than where a single screen must receive a heterogeneous mass and pick out the smallest of eight or nine sizes of fruit and deliver it unassisted into the proper bin. It might be said that the upper set of screens serve as a "hopper," discreetly delivering the fruit upon a plurality of lower screens, so as to avoid congestion on the latter. The result is that by such a superposition of screens the fruit is so divided and the work distributed that the capacity of the machine is practically doubled. This screening represents the first step in my process of grading.

It frequently happens in a certain run of fruit some particular grade is almost entirely missing—as, for example, it may be that the "50–60's" are so few in number that it is desired to cut out that grade altogether—or if it is found that the number of prunes per pound in any one compartment or bin is running too high or too low its standard has to be lowered or raised by the diversion of a portion of the fruit from one or the other adjacent screens. This is known as "blending" and is as much a part of the grading as the shaking of the fruit on the screens, because such blending is invariably necessary at some stage of the process and before the fruit is finally packed. In working with small quantities the blending can be done by hand; but the futility of such means is apparent in machines of this class where fruit is handled by the car-load. Continuity is here a prime essential.

This brings me to the second part of my invention. Beneath, central of, and transverse to each lower screen 5 5′, &c., is a roof-shaped structure 6, which diverts to one side or the other any fruit falling thereon. Beneath these roof-shaped structures are the bins into which the fruit is delivered according to the segregation before mentioned. The adjacent bins are separated from each other by the hinged dividing-walls 7, which normally are adapted to stand in a vertical position with their upper edges in close proximity to the dividing-line between two adjacent screens, as 5 5′, &c. These dividers 7 are adapted to swing in an arc of ninety degrees, more or less, being limited in their movement by the lower edges of the roof-shaped structure 6. These dividers are for the purpose of blending the products from any of the adjacent screens 5 5′, &c., either to permit only a portion of, say, the "60–70's" to mix with the "70–80's" or to divert entirely the product of one screen, as the "50–60's," entirely into an adjacent bin.

Any suitable means may be employed to retain the dividers at the proper angle. I generally use a flexible connection, as a chain, secured to the end of the divider, hooking a link over a fixed pin on the frame. This connection may be similar to that shown for the dividers 9 in Fig. 3. Thus any degree of blend or combination may be effected, and the fruit is received into the bins exactly according to the desired number of prunes per pound. These bins are constructed in two parts, so that delivery may be made from either side of the machine—that is, the machine is divided longitudinally by a central vertical partition 8, whereby the bins upon one side may be emptied while the others are filling. It is obvious that some such means must be provided in these large machines to dispose of the fruit as it comes through the screens if the operation is to be made continuous. It takes several hours to discharge the bins, as they each contain many tons. The stopping of a machine with a one-hundred-and-twenty-five-ton daily capacity for several hours each day would palpably reduce that capacity and the loss would be proportionate.

Upon the top of the vertical walls 8 are hinged a second set of dividers 9, longitudinally disposed of the machine. Each of these dividers controls a bin to whose transverse vertical walls the dividers 6 are hinged. The tops of the dividers 9 when in vertical position are slightly below the plane of the lower edges of the dividers 7. Upon either of the walls of the machine are the inclined surfaces or stops 10, against one or the other of which a divider 9 ordinarily rests. The turning of these longitudinal dividers may be effected by means of a cord 11, as shown. The bottoms of the bins are inclined, as 12, so as more readily to be discharged, while each bin is provided with a suitable closure 13.

As these machines are often forty or fifty feet in length and the screens may carry continuously a ton weight or more of fruit, the vibrations of the loaded frames caused by some three hundred reciprocations a minute must be minimized as much as possible. To this end I have devised the following means: In the first place, instead of disposing the power to reciprocate the screens at the head of the machine, as is usual, I have placed it centrally thereof. The frames 2 and 2′ are separated except for the apron or flap 18, which connects the adjacent lower screens on the two frames, whereby the fruit may travel uninterruptedly over said lower screens. This division of the frames takes place preferably at the end of the upper set of screens. So, properly, the forward frame will carry three upper and three lower screens, and the rear frame will carry the remaining or five lower screens. The lower screens will always lie in practically a continuous line. Above this point of juncture of and at right angles to the frames extends the shaft 14. The shaft has two cranks 15, to which are secured the pitmen 16. These latter attach to cross-bars 17, one of which bars is secured to the forward screen-frame and the other to the rear frame. As a result the two frames are given a simultaneous but opposite and balancing movement.

By reason of the mounting of the frames on the spring-arms and by the disposition of the power, as shown, only about half the power ordinarily used to operate machines of this type is necessary, for in the alternate reciprocation of the frames toward and from each other the spring-arms of one frame are tending to equalize the action of the arms of the other frame. Thus a rapid and smooth movement is obtained almost free of vibration and entirely devoid of the pounding action so often present, which if occurring in these large machines would soon cause a wreck of the whole mechanism.

Having thus described my invention, what I claim as new, and desire to secure by Letters Patent, is—

1. In an apparatus for grading prunes, the combination of two series of perforated screens, a shorter upper series, and a longer lower one, the screens in each series having perforations increasing in size from the receiving end of the machine and the screens in the upper series adapted to deliver the fruit simultaneously upon an equal number of the lower screens, whose perforations also increase from the head end of the machine, said last-named screen having its perforations smaller than the perforations in the screen immediately above it, and means whereby the screens are given a longitudinal shaking movement.

2. In an apparatus for grading prunes, the combination of two series of screens, an upper series and a longer lower and parallel series, said screens in each series having perforations of smallest diameter in the screen nearest the feed end of the apparatus, the perforations in the succeeding screen of successive large diameters, the perforations in the upper screens relatively larger than the perforations in the screens immediately beneath, and means whereby the fruit is made to travel over these screens.

3. In an apparatus for grading prunes, the combination of two series of screens, one above the other the uppermost having perforations of smallest diameter in the screen at the head of the machine and gradually increasing in size through the remaining screens, said screens adapted to pass successively two or more grades of fruit therethrough, a second series of screens beneath the upper series, having perforations of smallest diameter in the screen at the head of the machine, and gradually increasing in size through the remaining screens said screens adapted to pass successively but a single grade of fruit therethrough, and means by which these screens are given a longitudinally-shaking movement.

4. The combination in a fruit grading and classifying apparatus of grading-screens and blending means centrally below the same consisting of divergent transversely-disposed surfaces beneath the screens, and hinged coacting dividers interposed between adjacent blending means by which varying proportions of the product of adjacent screens may be mingled or diverted.

5. In a prune-grading apparatus, the combination of a plurality of horizontal perforated screens in line and forming an upper series, a second longer series of perforated screens below and parallel with and extending beyond the first series, said lower screens arranged in line with each other, the perforations in the screens in each series increasing in diameter from the receiving to the opposite end, the perforations in the upper series relatively larger and varying in wider proportion than the perforations in the lower screens, frames within which these two series are secured, a shaft centrally disposed of these frames and connections with the frame upon either side of the shaft whereby the frames are reciprocated.

6. An apparatus for grading and classifying prunes, consisting of two series of horizontally-disposed contiguous shaking-screens having perforations of gradually-increasing diameter from the commencement to the discharge end, said series consisting of a shorter upper one and a longer lower one, the screens in the upper series having perforations relatively larger than the perforations in the lower screens, roof-like sections transverse to, beneath and central of each of the lower screens, and dividers by which the product of any screen or any proportion of said product may be mingled with the discharge from adjacent screens.

7. The combination in an apparatus for grading and classifying prunes of a shorter upper and a longer lower series of approximately horizontal shaking-screens, with perforations of different sizes and increasing in diameter from the receiving to the opposite end, the screens in the upper series adapted to deliver the fruit simultaneously upon an equal number of the lower series, double inclined roof-like sections located transversely beneath the central portions of the lower screens, transverse sections hinged in line beneath the meeting edges of the screens, and turnable to divert a portion of the discharge of contiguous screens to either side, a longitudinally-disposed partition centrally located beneath said grading-sections, and sections hinged to its upper edge and turnable to divert the fruit to discharge upon either side of the apparatus.

8. The combination in a fruit grading and classifying apparatus, of grading-screens, fixed divergent, transversely-disposed surfaces located beneath the screens intermediate of their ends, and boards hinged in line beneath the junction of contiguous screens and turnable to form continuations of the divergent surfaces beneath either of said screens.

9. The combination in a fruit grading and classifying apparatus, of grading-screens, transverse downwardly-divergent surfaces fixed beneath the screens intermediate of their ends, transverse boards having their lower edges turnably supported approximately in planes below the junction of contiguous screens, whereby the upper edges may approach and form continuations with the divergent surfaces upon either side.

10. The combination in a fruit grading and classifying apparatus of grading-screens, fixed, downwardly-divergent, transversely-disposed surfaces centrally beneath the screens, transversely-hinged dividers coacting with said surfaces to mingle or divert the products of contiguous screens, longitudinally-divided bins, and longitudinally-hinged tilting boards, turnable to receive the blended product and divert it to the bins on either side.

11. In an apparatus for grading fruit two sets of horizontal perforated screens, consisting of an upper shorter set, and a lower longer set parallel with the upper set and having perforations increasing in diameter from the receiving to the discharging end, said lower set comprising two separate sections in line with each other but having an intervening space between adjacent ends, a flap or apron connecting the adjacent ends of said two sections whereby a continuous travel of fruit is effected, a rigid connection between the first section of the lower set and the upper set of screens and means for reciprocating both sets of screens.

12. In an apparatus for grading fruits, two sets of perforated screens consisting of an upper, shorter set, a longer lower set substantially parallel with the upper set and having perforations increasing in diameter from the receiving to the discharging end, said lower set comprising two separate sections in line with each other but having an intervening space between adjacent ends, a flap or apron connecting the adjacent ends of said two sections, whereby a continuous travel of fruit is effected, a connection between the first section of the lower set and the upper set of screens adapted to impart movement from one to the other, and means for reciprocating both sets of screens.

13. In an apparatus for grading fruits, two sets of perforated screens consisting of an upper, shorter set, a longer lower set substantially parallel with the upper set and having perforations increasing in diameter from the receiving to the discharging end, said lower set comprising two separate sections in line with each other but having an intervening space between adjacent ends, a flap or apron connecting the adjacent ends of said two sections, whereby a continuous travel of fruit is effected, and means for reciprocating both sets of screens and simultaneously reciprocating said first section of the lower set and said upper set of screens.

In witness whereof I have hereunto set my hand.

WILLIAM C. ANDERSON.

Witnesses:
WM. K. WHITE,
J. H. MILLER.